United States Patent
Xu et al.

(10) Patent No.: US 12,450,940 B1
(45) Date of Patent: Oct. 21, 2025

(54) IMAGE ENHANCEMENT FOR FINGERPRINT SENSOR DEPLOYED IN A FLEXIBLE DEVICE

(71) Applicant: QUALCOMM Incorporated

(72) Inventors: Changting Xu, San Jose, CA (US); Kwokleung Chan, Sunnyvale, CA (US); Jessica Liu Strohmann, Cupertino, CA (US); Wei-En Hsu, Taipei (TW); Jin Gu, Gloucester (CA); Chuenwen Chung, New Taipei (TW)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/895,228

(22) Filed: Sep. 24, 2024

(51) Int. Cl.
| | |
|---|---|
| *G06V 40/12* | (2022.01) |
| *G06F 21/32* | (2013.01) |
| *G06F 21/44* | (2013.01) |
| *G06V 10/98* | (2022.01) |
| *G06V 40/13* | (2022.01) |
| *G06V 40/50* | (2022.01) |

(52) U.S. Cl.
CPC .......... *G06V 40/1365* (2022.01); *G06F 21/32* (2013.01); *G06F 21/44* (2013.01); *G06V 10/993* (2022.01); *G06V 40/1318* (2022.01); *G06V 40/50* (2022.01)

(58) Field of Classification Search
CPC .. G06V 40/50; G06V 10/993; G06V 40/1318; G06V 40/1365; G06F 21/32; G06F 21/44
See application file for complete search history.

(56) References Cited

U.S. PATENT DOCUMENTS

| | | | |
|---|---|---|---|
| 2012/0098948 A1* | 4/2012 | Lee | A61B 5/1172 348/E7.085 |
| 2018/0276440 A1* | 9/2018 | Strohmann | G06V 40/1359 |
| 2019/0347390 A1* | 11/2019 | Kim | G06N 7/01 |
| 2022/0374054 A1* | 11/2022 | Heo | G06V 10/17 |

* cited by examiner

*Primary Examiner* — Premal R Patel
(74) *Attorney, Agent, or Firm* — QUALCOMM Incorporated

(57) ABSTRACT

Some methods may involve receiving fingerprint image data. Some methods may involve determining whether the fingerprint image data was captured by a first fingerprint sensor of a device or a second fingerprint sensor of the device. Some methods may involve obtaining an enhanced version of the fingerprint image data based on a determination that the fingerprint image data was captured by the second fingerprint sensor of the device. Some methods may involve providing the enhanced version of the fingerprint image data for authentication. In some examples, obtaining the enhanced version of the fingerprint image data may involve an image enhancement machine learning model. In some examples, prior to obtaining the enhanced version of the fingerprint image data, a determination is made that the fingerprint image data captured by the second fingerprint sensor fails to satisfy a quality threshold.

20 Claims, 10 Drawing Sheets

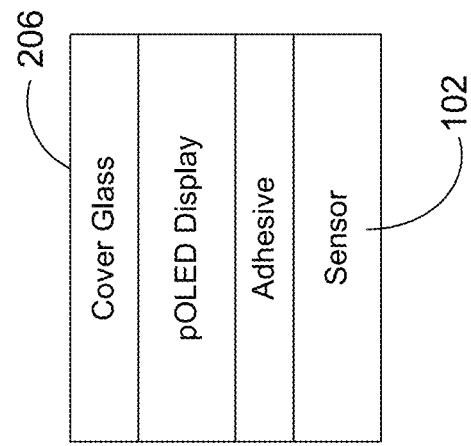
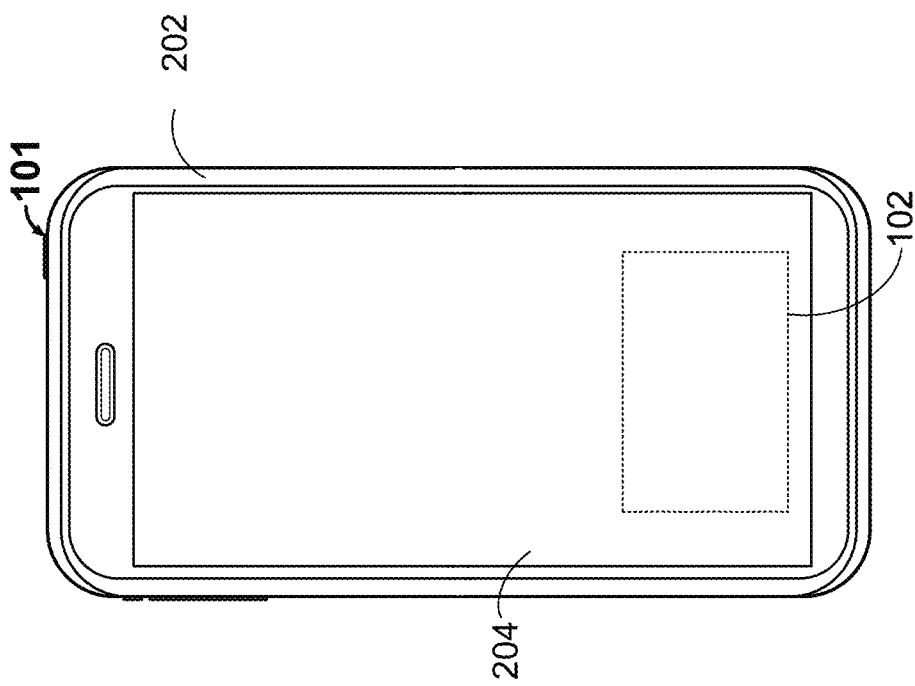
*Figure 2B*
*Figure 2A*

IMAGE ENHANCEMENT FOR FINGERPRINT SENSOR DEPLOYED IN A FLEXIBLE DEVICE

TECHNICAL FIELD

This disclosure relates generally to flexible devices, such as flexible display devices, that include fingerprint sensors and methods for using such devices.

DESCRIPTION OF THE RELATED TECHNOLOGY

Fingerprint sensors, including but not limited to ultrasonic fingerprint sensors, have been included in devices such as smartphones, cash machines, and cars to authenticate a user. Some fingerprint sensors are being deployed in flexible display devices, such as flexible mobile phones. It can be challenging to obtain satisfactory fingerprint image data from a fingerprint sensor deployed in a flexible display device. Improved methods for operating such devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented via one or more methods. In some examples, a method may involve receiving, by a control system, fingerprint image data; determining, by the control system, whether the fingerprint image data was captured by a first fingerprint sensor of a device or a second fingerprint sensor of the device, wherein the second fingerprint sensor produces lower quality fingerprint image data relative to the first fingerprint sensor; based on a determination that the fingerprint image data was captured by the second fingerprint sensor of the device, obtaining, by the control system, an enhanced version of the fingerprint image data; and providing, by the control system, the enhanced version of the fingerprint image data for authentication.

Other innovative aspects of the subject matter described in this disclosure may be implemented in an apparatus. The apparatus may include a user interface system that includes a display, a first fingerprint sensor system, a second fingerprint sensor system, a memory system and a control system configured for communication with the display, the first fingerprint sensor system, the second fingerprint sensor system, and the memory system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. In some implementations, a mobile device (such as a wearable device, a cellular telephone, etc.) may be, or may include, at least part of the apparatus.

According to some examples, the control system may be configured to receive fingerprint image data; determine whether the fingerprint image data was captured by the first fingerprint sensor or the second fingerprint sensor, wherein the second fingerprint sensor produces lower quality fingerprint image data relative to the first fingerprint sensor; based on a determination that the fingerprint image data was captured by the second fingerprint sensor, obtain an enhanced version of the fingerprint image data; and provide the enhanced version of the fingerprint image data for authentication.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform one or more methods. Some such methods may involve receiving, by a control system, fingerprint image data; determining, by the control system, whether the fingerprint image data was captured by a first fingerprint sensor of a device or a second fingerprint sensor of the device, wherein the second fingerprint sensor produces lower quality fingerprint image data relative to the first fingerprint sensor; based on a determination that the fingerprint image data was captured by the second fingerprint sensor of the device, obtaining, by the control system, an enhanced version of the fingerprint image data; and providing, by the control system, the enhanced version of the fingerprint image data for authentication.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIGS. 2A-2D show example views of a foldable display device and its corresponding display stacks as one implementation of the apparatus 101.

DETAILED DESCRIPTION

Figure 1:
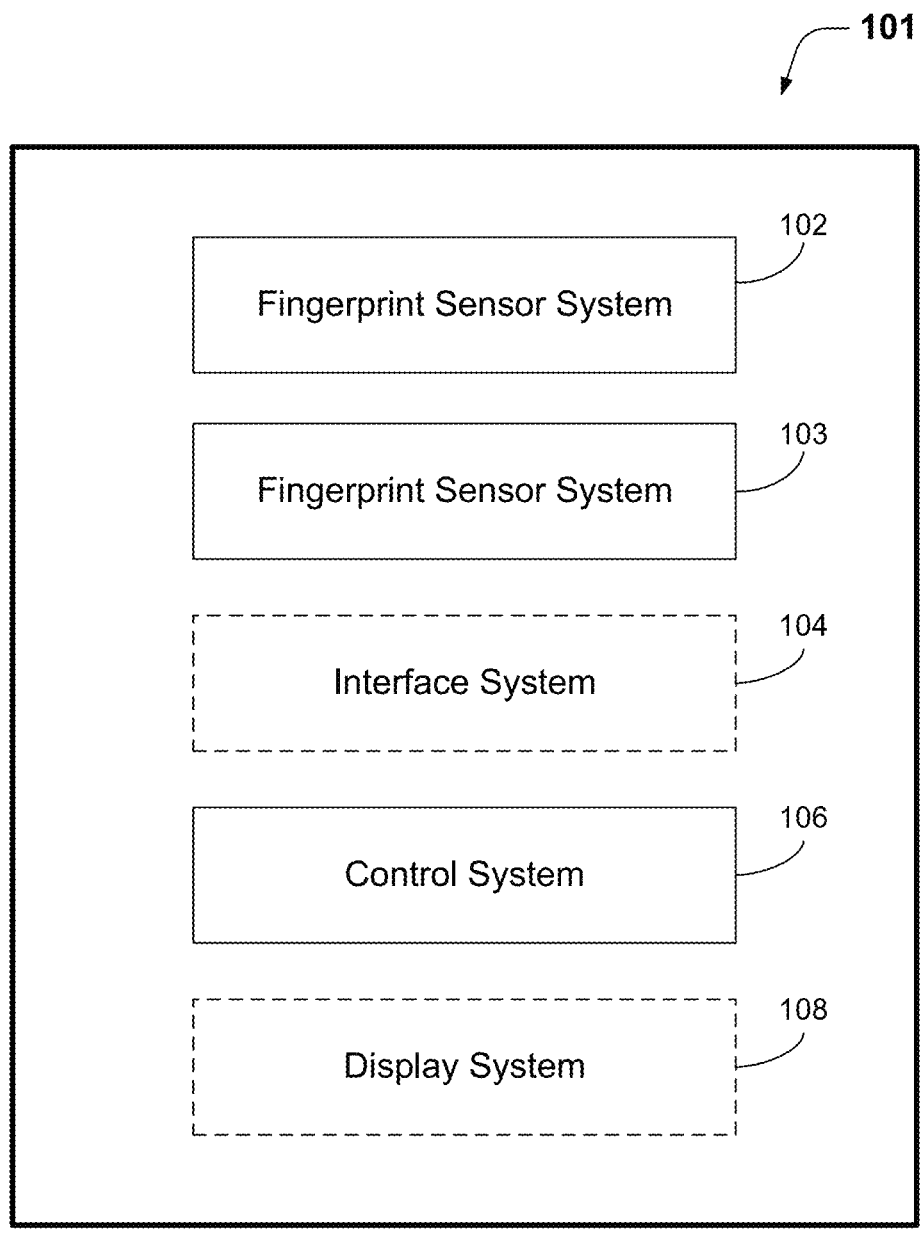
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automatic teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, automobile doors, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

As noted above, it can be challenging to obtain satisfactory fingerprint image data from a fingerprint sensor deployed in a flexible (or foldable) display device. (As used herein, the term "finger" can refer to any digit, including a thumb. Accordingly, the term "fingerprint" as used herein may refer to a print from any digit, including a thumb. Data received from a fingerprint sensor may sometimes be referred to herein as "fingerprint sensor data," "fingerprint image data," etc., although the data will generally be received from the fingerprint sensor system in the form of electrical signals. Accordingly, without additional processing such image data would not necessarily be perceivable by a human being as an image.)

A foldable display device may have a sub panel and a main panel. The sub panel may be accessible when the foldable display device is in a closed state (e.g., the main panel is folded). The sub panel may include a display screen and a fingerprint sensor ("sub panel sensor"). Further, the main panel may be accessible when the foldable display device is in an open state, e.g., when the main panel is unfolded. Similarly, the main panel may include a display screen and its own fingerprint sensor ("main panel sensor"). Due to differences in the arrangement of display stack layers in the sub panel and the main panel, the main panel sensor may capture fingerprint image data that is of much lower quality than fingerprint image data captured by the sub panel sensor. As a result, users that attempt to authenticate their fingerprints using the main panel sensor may experience a higher false rejection rate, which is a measure of how often a fingerprint sensor system incorrectly rejects an authorized user. A higher false rejection rate may lead to user frustration in addition to increased consumption of power and computational resources due to repeated authentication attempts.

In some implementations, an apparatus may include a control system configured to process fingerprint image data differently depending on whether the fingerprint image data was captured by the sub panel sensor or the main panel sensor. That is, the control system may be configured to authenticate a user based on fingerprint image data captured by the sub panel sensor using a fingerprint matching process. In contrast, for fingerprint image data captured by the main panel sensor, the control system may be configured to obtain an enhanced version of the fingerprint image data, and then authenticate a user based on the enhanced version of the fingerprint image data using the fingerprint matching process. The enhanced version of the fingerprint image data may be generated by a trained image enhancement machine learning model. The image enhancement machine learning model may be trained to generate enhanced versions of fingerprint image data that resembles examples of fingerprint image data captured by the sub panel sensor. In some implementations, the control system may determine whether the fingerprint image data captured by the main panel sensor satisfies a quality threshold before obtaining the enhanced version of the fingerprint image data. In such implementations, a user may be authenticated without enhancing the fingerprint image data captured by the main panel sensor when the quality threshold is satisfied.

In some implementations, the image enhancement machine learning model may be trained as a generative adversarial network (GAN) that includes at least one generator to generate enhanced versions of fingerprint image data. The GAN may also include at least one discriminator configured to determine a level of similarity between enhanced versions of fingerprint image data outputted by the generator and enhanced versions of fingerprint image data captured by the sub panel sensor.

Particular implementations of the subject matter described in this disclosure may be implemented to realize one or more of the following potential advantages. According to some examples, a trained image enhancement machine learning model may enhance fingerprint image quality captured by a fingerprint sensor ("low-quality sensor") of a device that typically captures lower quality fingerprint image data relative to a different fingerprint sensor ("high-quality sensor") of the device. The trained image enhancement machine learning model may transform fingerprint image data captured by the low-quality sensor to more closely resemble fingerprint image data captured by the high-quality sensor. As a result, fingerprint image data captured by the low-quality sensor may be enhanced and used to authenticate a user of the device with an improved false rejection rate. By reducing the false rejection rate, the user may require fewer authentication attempts, which ultimately reduces the amount of power and computational resources needed to otherwise authenticate the user.

FIG. 1 is a block diagram that shows example components of an apparatus 101 according to some disclosed implementations. As with other disclosed implementations, the types, number and arrangement of elements shown in FIG. 1 are merely presented by way of example. Other implementations may have other types, numbers and/or arrangements of elements. In this example, the apparatus 101 includes a fingerprint sensor system 102, a fingerprint sensor system 103, and a control system 106. Some implementations of the apparatus 101 may include an interface system 104 and a display system 108.

The fingerprint sensor system 102 and the fingerprint sensor system 103 may implement any suitable type of fingerprint sensor system, such as an optical fingerprint sensor system, a capacitive fingerprint sensor system, a resistive fingerprint sensor system, a radio frequency-based fingerprint sensor system, etc. In some examples the fingerprint sensor system may be, or may include, an ultrasonic fingerprint sensor system.

Some implementations of the apparatus 101 may include an interface system 104. In some examples, the interface system 104 may include a wireless interface system. In some implementations, the interface system 104 may include a user interface system, one or more network interfaces, one or more interfaces between the control system 106 and a memory system, and/or one or more interfaces between the control system 106 and one or more external device interfaces (e.g., ports or applications processors).

The interface system 104 may be configured to provide communication (which may include wired or wireless communication, such as electrical communication, radio communication, etc.) between components of the apparatus 101. In some such examples, the interface system 104 may be configured to provide communication between the control system 106 and the fingerprint sensor system 102, between the control system 106 and the fingerprint sensor system 103, and between the control system 106 and the display system 108 (if present). According to some such examples, the interface system 104 may couple at least a portion of the control system 106 to the fingerprint sensor system 102 and to the fingerprint sensor system 103 (as well as the display system 108, if present), e.g., via electrically conducting material such as conductive metal wires or traces.

According to some examples, the interface system 104 may be configured to provide communication between the apparatus 101 and other devices and/or human beings. In some such examples, the interface system 104 may include a user interface system having one or more user interfaces. The user interface system may, for example, include one or more loudspeakers, a touch and/or gesture sensor system, a haptic feedback system, etc. Although not shown as such in FIG. 1, the optional display system 108 may be considered to be part of the interface system 104.

The interface system 104 may, in some examples, include one or more network interfaces and/or one or more external device interfaces (such as one or more universal serial bus (USB) interfaces and/or a serial peripheral interface (SPI)). In some implementations, the apparatus 101 may include a memory system in addition to memory that the control system 106 may include. The interface system 104 may, in some examples, include at least one interface between the control system 106 and the memory system.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 may include dedicated components for controlling the fingerprint sensor system 102 and the fingerprint sensor system 103 (as well as the display system 108, if present). The control system 106 also may include (and/or be configured for communication with) one or more memory devices, such as one or more random access memory (RAM) devices, read-only memory (ROM) devices, etc. Accordingly, the apparatus 101 may have a memory system that includes one or more memory devices, though the memory system is not shown in FIG. 1. In some implementations, functionality of the control system 106 may be partitioned between one or more controllers or processors, such as between a dedicated sensor controller and an applications processor of a mobile device.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

FIGS. 2A-2D show example views of a foldable display device and its corresponding display stacks as one implementation of the apparatus 101. As with other disclosed implementations, the types of elements, the numbers of elements, the arrangements of elements, etc., shown in FIGS. 2A-2D are merely shown by way of example. Other implementations may include different types, numbers and/or arrangements of elements.

Figure 2D:
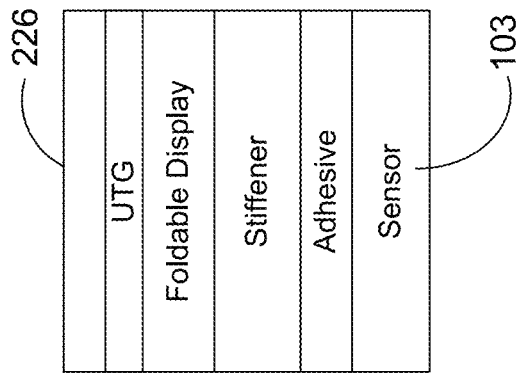
Figure 2C:
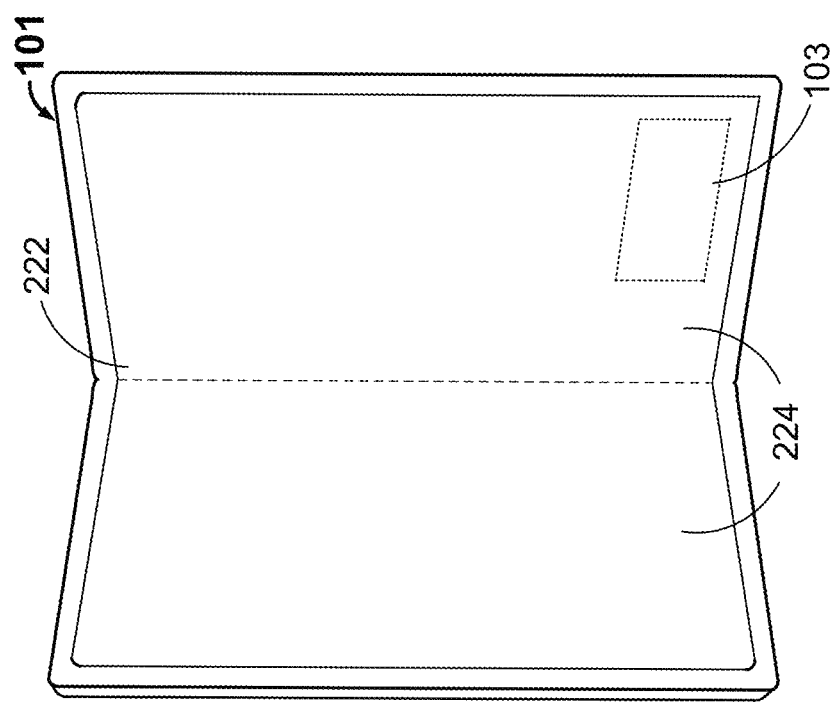

As shown in FIGS. 2A and 2C, the foldable display device may have a sub panel 202 and a main panel 222, as shown in the examples of FIGS. 2A and 2B. The sub panel 202 may be accessible when the foldable display device is in a closed state, e.g., when the main panel 222 is folded. The sub panel 202 may include a display screen 204 and the fingerprint sensor system 102. Further, the main panel 222 may be accessible when the foldable display device is in an open state, e.g., when the main panel 222 is unfolded. Similarly, the main panel 222 may include a display screen 224 and the fingerprint sensor system 103.

The sub panel 202 and the main panel 222 may have different display stack layers. For example, as shown in FIG. 2B, the sub panel 202 may have a display stack 206, which may include a cover glass layer, a plastic organic light emitting diode (pOLED) display layer, and an adhesive layer. The main panel 222 may have a more complicated display stack 226 to accommodate its foldable design, as shown in FIG. 2D. As an example, the display stack 226 may include an ultra-thin glass (UTG) layer, a foldable display layer, a stiffener layer, and an adhesive layer.

Due to the complexity of the display stack 226 for the main panel 222, the fingerprint sensor system 103 that is accessible from the main panel 222 may capture fingerprint image data that is of lower quality than fingerprint image data captured by the fingerprint sensor system 102 accessible from the sub panel 202. In various implementations, the quality of fingerprint image data captured by the fingerprint sensor system 102 or the fingerprint sensor system 103 may be measured based on one or a combination of the following attributes: resolution, distortion, contrast, or noise. As an example, quality may be measured based on a signal-to-noise (SNR) ratio. In general, a higher SNR indicates clearer, more detailed fingerprint image data with less background noise, which may lead to better feature extraction and matching accuracy. As another example, quality may be measured based on a weighted signal on resolution. For example, the signal may be weighted 100% when fingerprint image data corresponds to 2-2.5 lpmm (lines per millimeter) and may be weighted 20% when fingerprint image data corresponds to 2.5-3.2 lpmm. Many variations are contemplated.

Figure 3:
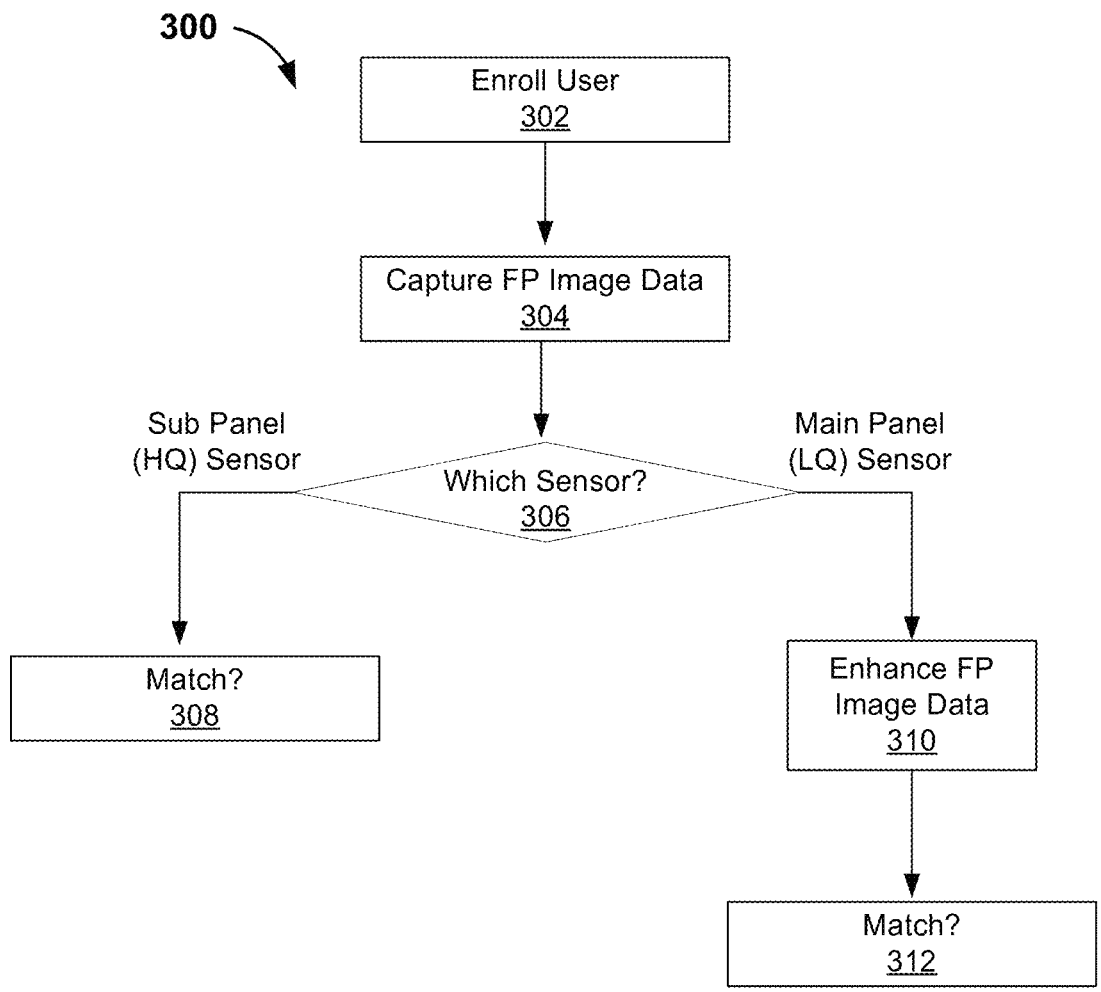
FIG. 3 is a flow diagram that provides example blocks of some methods disclosed herein.

FIG. 3 is a flow diagram that provides example blocks of some methods disclosed herein. The blocks of FIG. 3 may, for example, be performed (at least in part) by the control system 106 of FIG. 1. As with other methods disclosed herein, the method 300 outlined in FIG. 3 may include more or fewer blocks than indicated. Moreover, the blocks of methods disclosed herein are not necessarily performed in the order indicated. In some examples, some blocks of methods disclosed herein may be performed concurrently or substantially concurrently.

In this example, the method 300 optionally begins with block 302. Block 302 may, for example, involve enrolling a user of the foldable display device. The enrollment process may involve the user placing their finger multiple times on a fingerprint sensor system. In some implementations, the enrollment process is performed using the fingerprint sensor system 102 on the sub panel 202. The fingerprint sensor system 102 may capture a high-resolution image of the user's fingerprint each time. These images may then be processed to extract the unique features and patterns of the fingerprint, such as the ridges, valleys, and minutiae points. The extracted features may be used to create a mathematical representation of the fingerprint (e.g., a fingerprint template), which is securely stored in memory on the foldable display device. During the enrollment phase, the user may be prompted to place their finger at slightly different angles or positions each time, allowing the system to capture a comprehensive map of the finger. Once the enrollment is complete, the stored fingerprint template may be used as a reference for comparison during future authentication attempts. In some implementations, the enrollment process may be adaptive. That is, once the user is initially enrolled, the adaptive enrollment process may involve continually refining the fingerprint template associated with the user with fingerprint image data that is captured during subsequent authentication attempts.

In this example, block 304 involves capturing fingerprint (FP) image data by either the fingerprint sensor system 102 or the fingerprint sensor system 103. For example, the fingerprint image data may be captured when the user of the foldable display device attempts authentication by placing a finger on either the fingerprint sensor system 102 on the sub panel 202 or the fingerprint sensor system 103 on the main panel 222.

In this example, block 306 involves determining which fingerprint sensor system was used to capture the fingerprint image data. In this example, if it is determined in block 306 that the fingerprint image data was captured by the fingerprint sensor system 102 on the sub panel 202, method 300 may proceed to block 308, which may involve matching the fingerprint image data based on the matching process. In some implementations, when successfully matched by the matching process, the fingerprint image data captured by the fingerprint sensor system 102 may be stored as templates as part of an adaptive enrollment process to be used for future authentication attempts.

The matching process may involve analyzing the fingerprint image data to extract unique fingerprint features, such as the pattern of ridges, valleys, and minutiae points. The extracted features may be converted into a mathematical representation of the fingerprint image data (e.g., a fingerprint template). The template of the fingerprint image data may then be compared against enrolled fingerprint template(s) already stored on the foldable display device. The comparison may involve calculating a degree of similarity (or similarity score) between the template of the fingerprint image data and the enrolled fingerprint template(s), to determine if there is a match. The matching may be performed by measuring the distances and relative positions of specific fingerprint features. In this example, if the similarity score satisfies a predefined threshold, the match is successful, and the user is authenticated. For example, upon authentication, the apparatus may be "unlocked" (e.g., the user is granted access to the apparatus or one or more software applications running on the apparatus). In contrast, if the score fails to satisfy the threshold, the match is unsuccessful, and the user may be prompted to try again or use an alternate authentication method.

In this example, if it is determined in block 306 that the fingerprint image data was captured by the fingerprint sensor system 103 on the main panel 222, method 300 may proceed to block 310, which may involve enhancing the fingerprint image data. The fingerprint image data may be enhanced by an image enhancement machine learning model, as described in reference to FIGS. 5A-5B and 6. For example, the image enhancement machine learning model may process the fingerprint image data as input and may output an enhanced version of the fingerprint image data.

In this example, block 312 may involve matching the enhanced version of the fingerprint image data with enrolled fingerprint template(s) based on the matching process, as described above in block 308.

Figure 4:
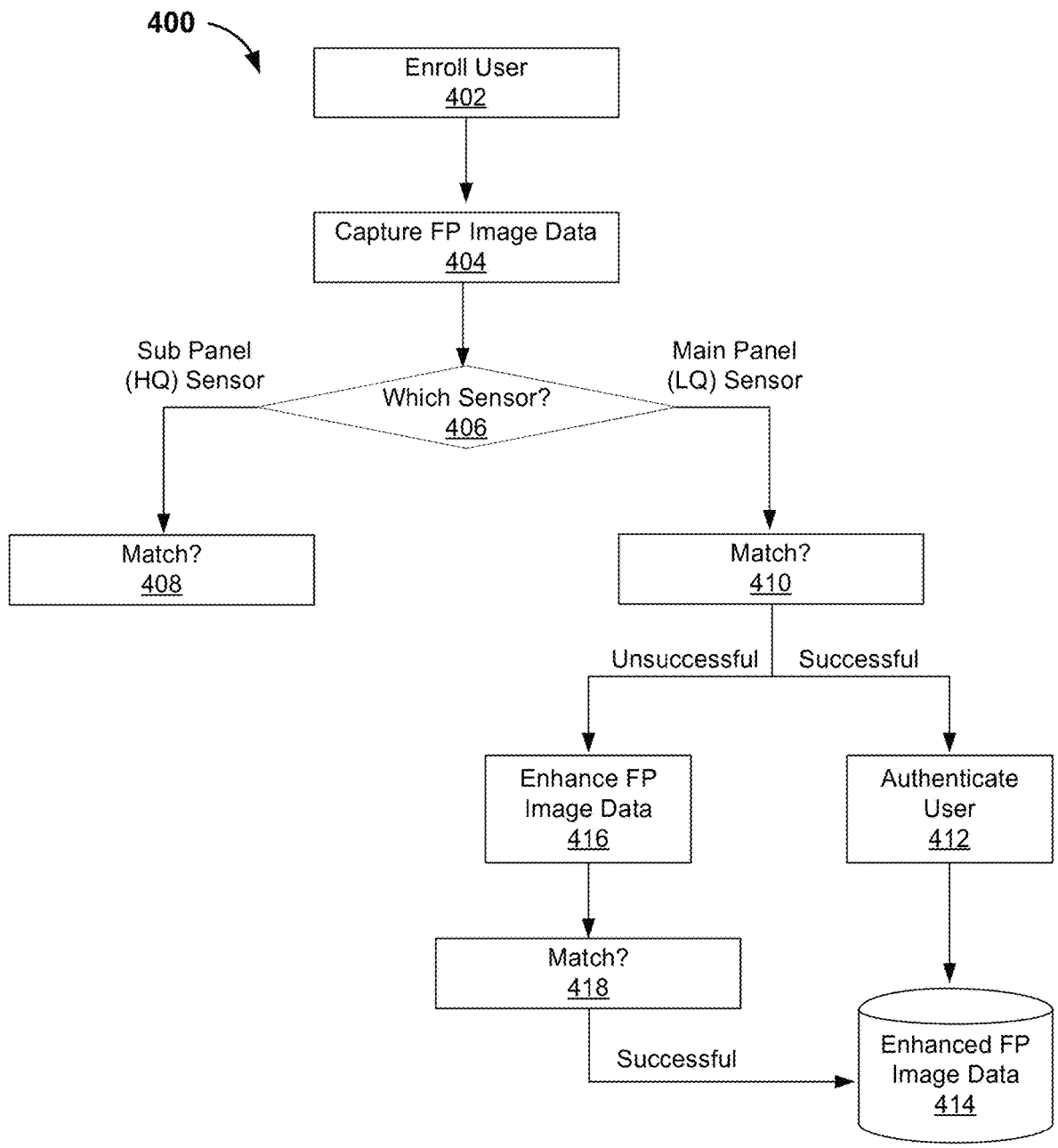
FIG. 4 is a flow diagram that provides example blocks of some methods disclosed herein.

FIG. 4 is a flow diagram that provides example blocks of some methods disclosed herein. The blocks of FIG. 4 may, for example, be performed (at least in part) by the control system 106 of FIG. 1. As with other methods disclosed herein, the method 400 outlined in FIG. 4 may include more or fewer blocks than indicated. Moreover, the blocks of methods disclosed herein are not necessarily performed in the order indicated. In some examples, some blocks of methods disclosed herein may be performed concurrently or substantially concurrently.

In this example, blocks 402-408 may correspond to blocks 302-308 of FIG. 3 and may be performed as described above. However, in this example, if it is determined in block 406 that the fingerprint image data was captured by the fingerprint sensor system 103 on the main panel 222, method 400 may proceed to block 410, which may involve matching the fingerprint image data with enrolled fingerprint template(s) based on the matching process described herein.

In this example, if the matching process in block 410 determines a successful match between a fingerprint template of the fingerprint image data and an enrolled fingerprint template, method 400 may proceed to block 412, which involves authenticating the user. In some implementations, when successfully matched by the matching process, the fingerprint image data captured by the fingerprint sensor system 103 may be enhanced based on the image enhancement machine learning model and stored as a fingerprint template for future authentication attempts. In some implementations, fingerprint templates corresponding enhanced fingerprint image data may be stored in block 414. In this example, the fingerprint templates corresponding enhanced fingerprint image data may be stored separately from fingerprint templates corresponding to fingerprint image data that has not been enhanced by the image enhancement machine learning model. In such implementations, the fingerprint templates corresponding enhanced fingerprint image data stored in block 414 may be used in block 418 to match enhanced versions of fingerprint image data.

In some implementations, block 410 may serve as a threshold mechanism that determines whether the fingerprint image data captured by the fingerprint sensor system 103 is enhanced for authentication. That is, per block 410, the fingerprint image data is not enhanced for authentication when the fingerprint image data is successfully matched to enrolled fingerprint image data. In contrast, the fingerprint image data is enhanced for authentication when the fingerprint image data is not successfully matched to enrolled fingerprint image data.

In this example, if the matching process in block 410 determines an unsuccessful match between the fingerprint image data and enrolled fingerprint image data, method 400 may proceed to block 416, which involves enhancing the fingerprint image data. The fingerprint image data may be enhanced by the image enhancement machine learning model, as described in reference to FIGS. 5A-5B and 6. For example, the image enhancement machine learning model may process the fingerprint image data as input and may output an enhanced version of the fingerprint image data.

In this example, block 418 may involve matching the enhanced version of the fingerprint image data. That is, the enhanced version of the fingerprint image data may be matched against enhanced fingerprint image data from block 414 based on the matching process described herein. In some implementations, when successfully matched by the matching process, the enhanced version of the fingerprint image data captured by the fingerprint sensor system 103 may be stored for future authentication attempts, as described in reference to block 414.

Figure 5A:
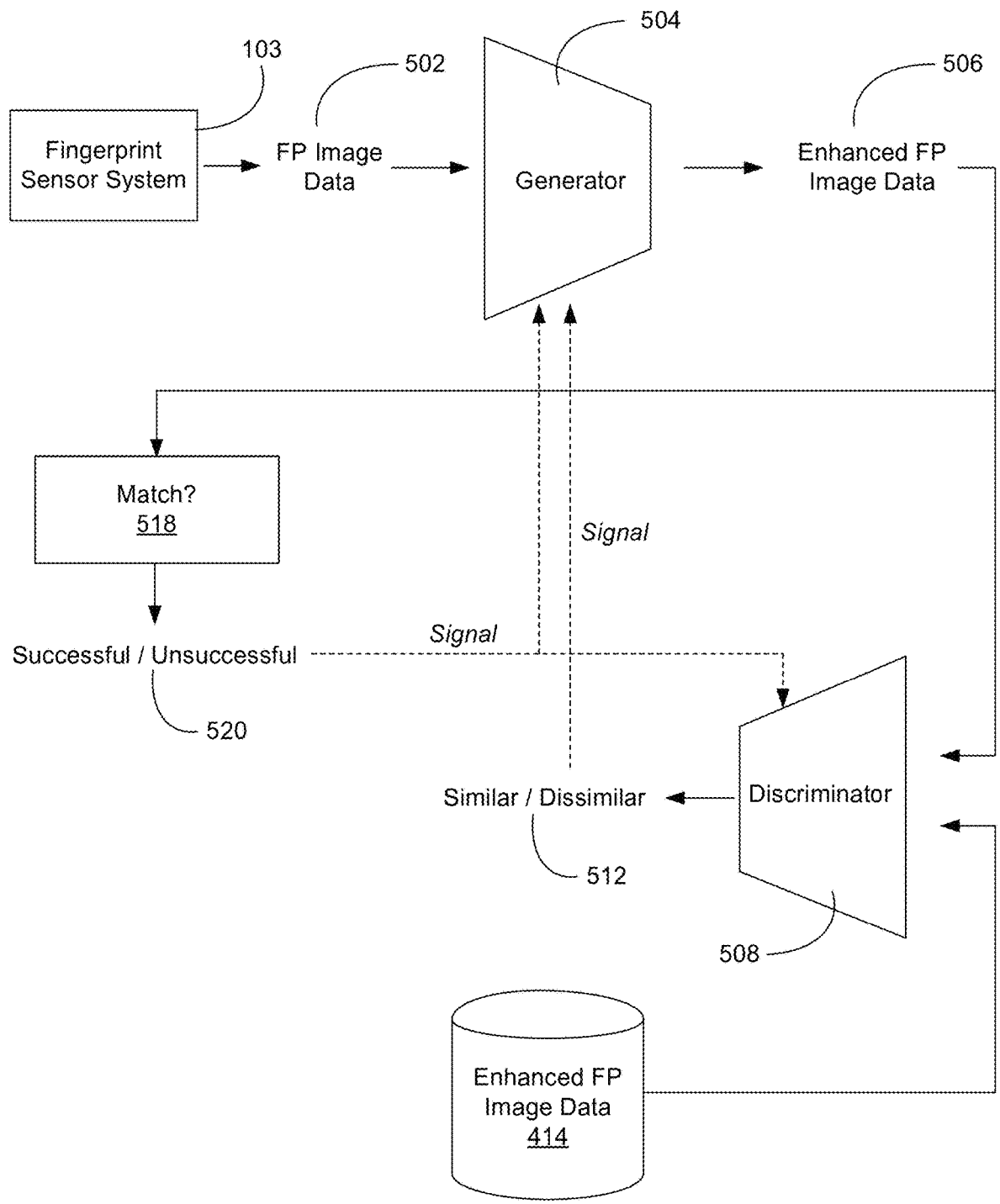
FIG. 5A shows blocks involved in training a neural network to generate enhanced versions of fingerprint image data obtained from the fingerprint sensor system 103.

FIG. 5A shows blocks involved in training a neural network to generate enhanced versions of fingerprint image data obtained from the fingerprint sensor system 103. In this example, the neural network is a generative adversarial network (GAN) although other implementations are contemplated. In some implementations, the GAN may be trained as part of an offline training process by computing systems separate from the apparatus 101.

In the example of FIG. 5A, fingerprint (or "FP") image data 502 captured by the fingerprint sensor system 103 may be obtained. The fingerprint image data 502 may be provided as input to an image enhancement machine learning model that includes at least one neural network corresponding to a generator 504 and at least one neural network corresponding to a discriminator 508. The image enhancement machine learning model may be trained to transform the fingerprint image data 502 from a first domain to a second domain. In this example, the first domain may correspond to fingerprint image data captured by the fingerprint sensor system 103 and the second domain may correspond to fingerprint image data captured by the fingerprint sensor system 102.

In this example, the generator 504 may output an enhanced version 506 of the fingerprint image data 502. In this example, the enhanced version 506 of the fingerprint image data 502 may be provided as input to both the discriminator 508 and a matching process 518. The generator 504 may generate synthetic data samples (e.g., the enhanced version 506 of the fingerprint image data 502) that correspond to a target domain (e.g., the enhanced fingerprint image data from block 414).

The discriminator 508 may receive both samples from the target domain and the generated synthetic data samples and attempt to distinguish between them, predicting the probability of a pair of samples being similar (or real) or dissimilar (or fake). In this example, the discriminator 508 may evaluate the enhanced version 506 of the fingerprint image data 502 against a second input that corresponds to an enhanced version of fingerprint image data that may have been stored in block 414.

In this example, the discriminator 508 may determine (or predict) a level of similarity between the two inputs. In this example, the discriminator 508 may provide an output 512 that indicates whether the two inputs are similar or dissimilar. In some implementations, the output 512 may be provided to the generator 504 as a signal that may be used to refine (or improve) capabilities of the generator 504. For example, the generator 504 may implement a loss function that is calculated based, in part, on an output from the discriminator 508. A loss computed based on the loss function may be backpropagated through the generator 504, computing gradients of the loss with respect to weights associated with the generator 504. Based on the backpropagation, parameters of the generator 504 may be adjusted to produce samples that are more likely to be classified by the discriminator 508 as being similar.

In this example, the matching process 518 may perform operations similar to block 312 of FIG. 3 or block 418 of FIG. 4. In this example, the matching process 518 may provide an output 520 indicating whether the enhanced version 506 of the fingerprint image data 502 was successfully used to authenticate a user. In some implementations, the output 520 may be provided to the generator 504 as a signal that may be used to refine (or improve) capabilities of the generator 504. For example, the generator 504 may implement a loss function that is calculated based, in part, on outputs from both the discriminator 508 and the matching process 518. The output 520 from the matching process 518 may provide an additional signal that may be used to refine the generator 504 towards producing enhancements to fingerprint image data that are more likely to be classified as similar by the discriminator 508 and successfully matched by the matching process 518. In some implementations, the output 520 from the matching process 518 may provide an additional signal that may be used to refine the discriminator 508 to better discriminate between generated and real fingerprint image data. For example, the discriminator 508 may implement a loss function that is calculated based, in part, on outputs from the matching process 518.

Figure 5B:
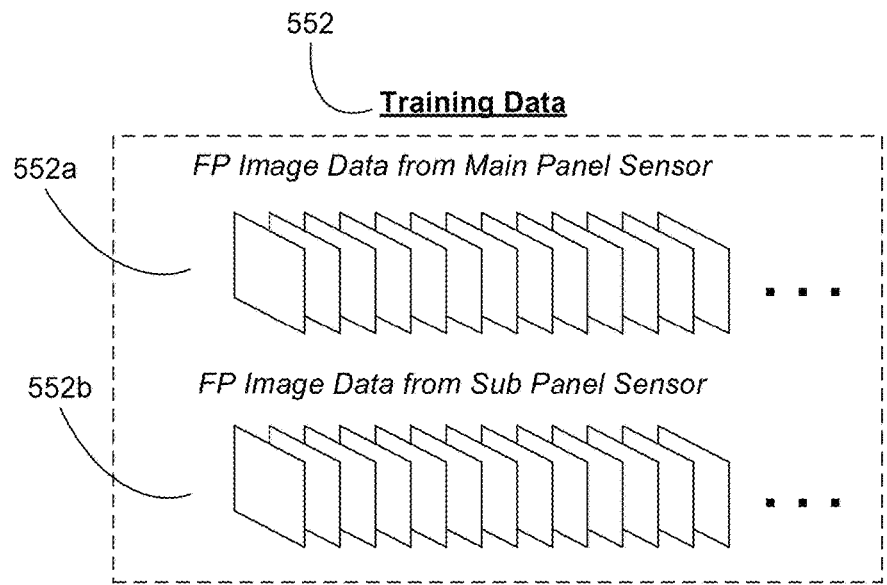
FIG. 5B shows blocks involved in training the neural network to generate enhanced versions of fingerprint image data obtained from the fingerprint sensor system 103.
Figure 5B:
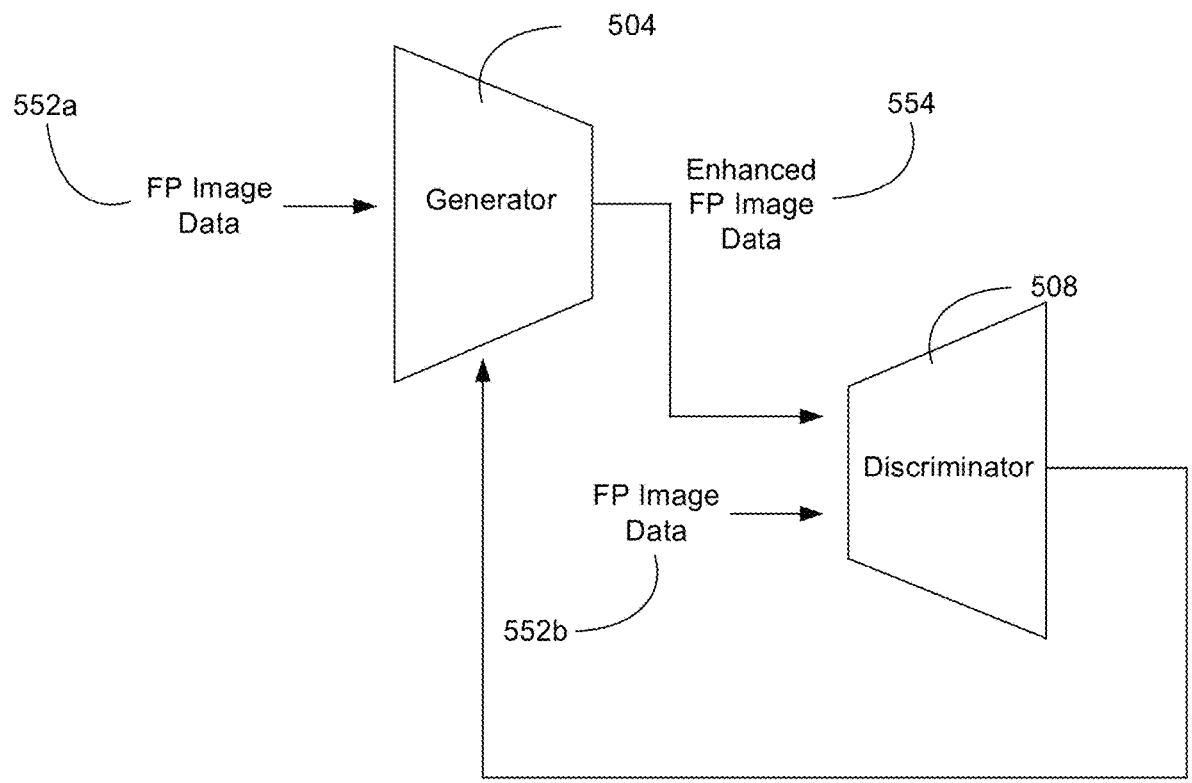

FIG. 5B shows blocks involved in training the neural network to generate enhanced versions of fingerprint image data obtained from the fingerprint sensor system 103. In this example, the neural network is the generative adversarial network (GAN) described in reference to FIG. 5A, although other implementations are contemplated. In some implementations, the GAN may be trained as part of an offline training process by computing systems separate from the apparatus 101.

The GAN may be trained to transform fingerprint image data from a first domain (or source domain) to a second domain (or target domain). The GAN may be trained based on training data that includes a set of examples corresponding to the source domain and a set of examples corresponding to the target domain. In this example, the GAN may be trained based on training data 552 that includes examples of fingerprint image data captured by the fingerprint sensor system 103, which represent the source domain 552a, and examples of fingerprint image data captured by the fingerprint sensor system 102, which represent the target domain 552b.

The GAN may be trained through an adversarial training process involving at least the generator 504 and the discriminator 508. In this example, the generator 504 may take an example from the source domain 552a as input and attempt to transform the example into the style of the target domain 552b, thereby producing enhanced fingerprint image data 554. The discriminator 508 may receive both the enhanced fingerprint image data 554 from the generator 504 and an example from the target domain 552b. In this example, the discriminator 508 may attempt to distinguish between enhanced fingerprint image data 554 and fingerprint image data from the target domain 552b. During training, the generator 504 may be incentivized to fool the discriminator 508 by producing increasingly realistic transformations while the discriminator 508 learns to better differentiate between enhanced fingerprint image data from the source domain 552a and fingerprint image data from the target domain 552b. The training process may cause the generator 504 to learn the key characteristics of the target domain 552b.

Over many training iterations, the generator 504 may learn to map fingerprint image data from the source domain 552a to the target domain 552b in a way that makes fingerprint image data from the source domain 552a indistinguishable from fingerprint image data in the target domain 552b, as determined by the discriminator 508. This adversarial feedback may allow the GAN to perform image-to-image transformations (or translations).

In some implementations, the generator 504 may be implemented as a convolutional neural network (CNN). In some implementations, the generator 504 may be implemented as a residual network (ResNet) that includes "skip connections" that may bypass one or more layers in the generator 504. The skip connections may provide a shortcut path for information to flow directly between layers of the generator 504. As a result, the skip connections may help the generator 504 learn a more robust and meaningful mapping between the source domain 552a and the target domain 552b. In some implementations, the generator 504 may be implemented as a U-shaped convolutional network (U-Net), which may include an encoder-decoder structure and skip connections suited for transforming fingerprint image data from the source domain 552a to the target domain 552b. In such implementations, the encoder may capture context while the decoder enables precise localization, thereby allowing the U-Net to learn both high-level and low-level features for effective transformation of fingerprint image data between the two domains.

Figure 6:
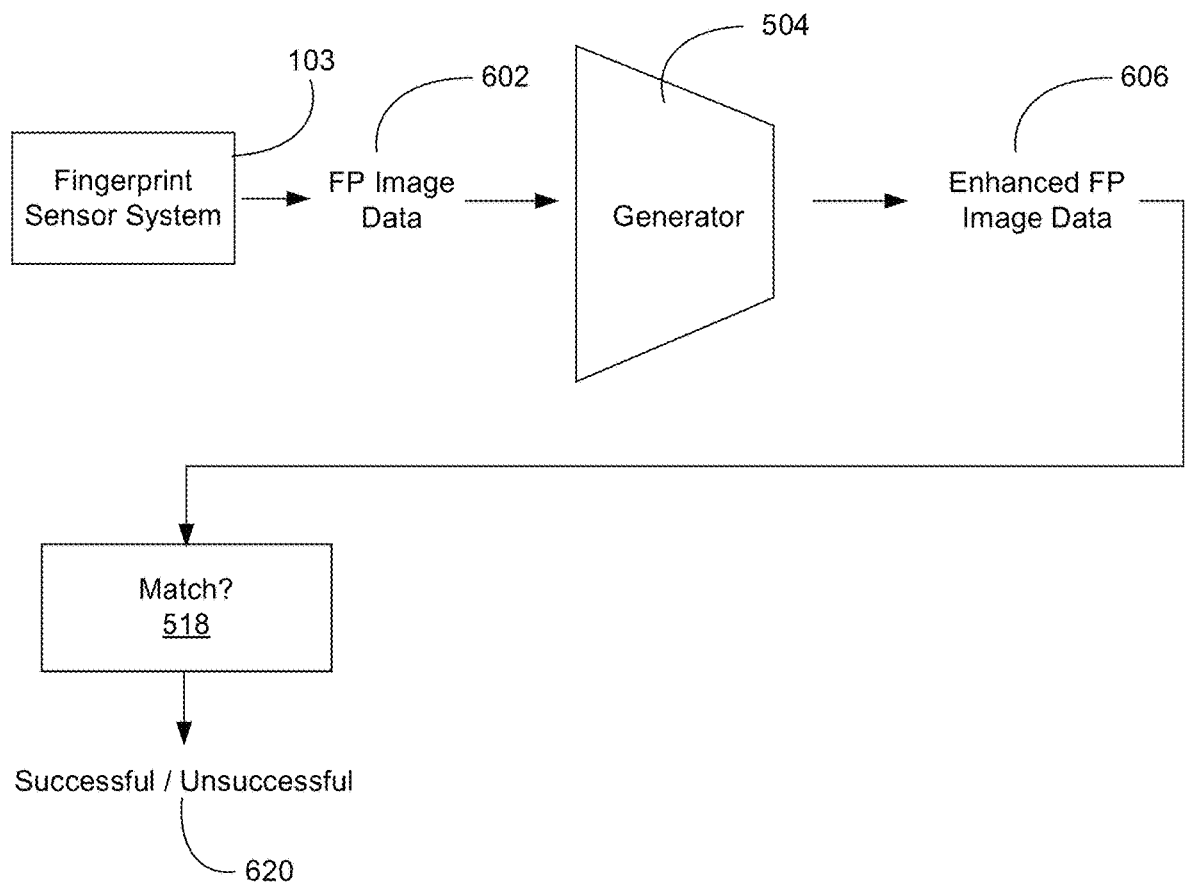
FIG. 6 shows blocks involved in applying the neural network to generate enhanced versions of fingerprint image data.

FIG. 6 shows blocks involved in applying a neural network to generate enhanced versions of fingerprint image data. Blocks 504 and 518 may, for example, be performed (at least in part) by the control system 106 of FIG. 1.

In the example of FIG. 6, fingerprint (or "FP") image data 602 captured by the fingerprint sensor system 103 may be obtained. The fingerprint image data 602 may be provided as input to an image enhancement machine learning model that includes at least one neural network corresponding to the generator 504, which has been trained as described in FIGS. 5A-5B. In this example, the trained generator 504 may be deployed in the apparatus 101.

In this example, the generator 504 may output an enhanced version 606 of the fingerprint image data 602. The enhanced version 606 of the fingerprint image data 602 may be provided as input to the matching process 518.

In this example, the matching process 518 may perform operations similar to block 312 of FIG. 3 or block 418 of FIG. 4. In this example, the matching process 518 may provide an output 620 indicating whether the enhanced version 606 of the fingerprint image data 602 was successfully used to authenticate a user.

Figure 7:
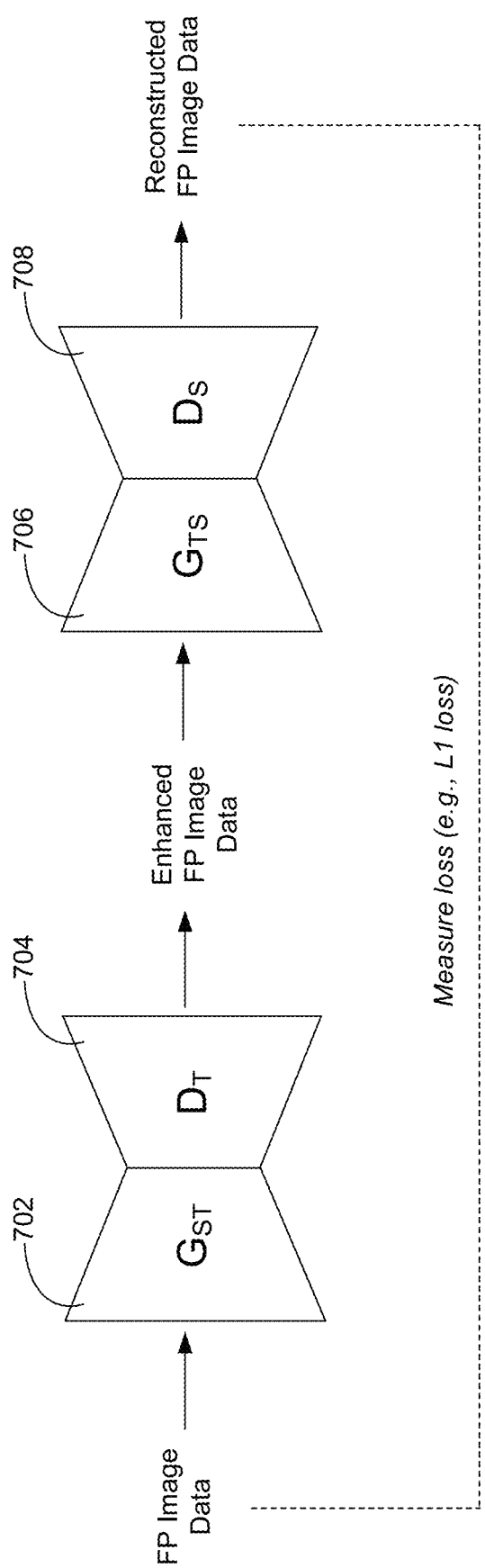
FIG. 7 shows an example implementation of the neural networks of FIGS. 5A-5B and 6 as a cycle-consistent generative adversarial network.

In some implementations, the neural networks of FIGS. 5A-5B and 6 may be implemented as a cycle-consistent generative adversarial network. FIG. 7 shows an example implementation of the neural networks of FIGS. 5A-5B and 6 as a cycle-consistent generative adversarial network (CycleGAN). The CycleGAN may transform images from the source domain 552a to the target domain 552b without requiring paired training examples. In some implementations, the CycleGAN architecture may consist of two generators and two discriminators. The generators may be implemented as CNNs, ResNets, or U-Nets, as described herein. In this example, a generator $G_{ST}$ 702 may learn to transform images from the source domain 552a to the target domain 552b while a generator $G_{TS}$ 706 may learn the reverse mapping from the target domain 552b to the source domain 552a. A discriminator $D_T$ 704 may learn to distinguish between real fingerprint image data from the target domain 552b and fingerprint image data generated by generator $G_{ST}$ 702. A discriminator $D_S$ 708 may learn to distinguish between real images from the source domain 552a and images generated by generator $G_{TS}$ 706. In this example, the full training objective may combine an adversarial loss that encourages the generators $G_{ST}$ 702 and $G_{TS}$ 706 to produce enhanced (or realistic) fingerprint image data. In some implementations, a cycle consistency loss may be employed to help ensure enhanced fingerprint image data may be mapped back to the source domain 552a. The cycle consistency loss may encourage the generators $G_{ST}$ 702 and $G_{TS}$ 706 to preserve fingerprint content during transformation and avoid introducing new fingerprint features. Over many training iterations, the generators $G_{ST}$ 702 and $G_{TS}$ 706 may learn to capture the characteristics of the target domain 552b while the discriminators $D_T$ 704 and $D_S$ 708 improve their ability to detect enhanced fingerprint image data, thereby facilitating cross-domain transformation.

In some implementations, the training of the image enhancement machine learning model may be performed as an offline process, which may involve the use of complex computing infrastructure. Once trained, the image enhancement machine learning model may be deployed in a device, such as the foldable display device, as AI-at-the-edge technology, so that model inference may be performed locally by the device.

Figure 8:
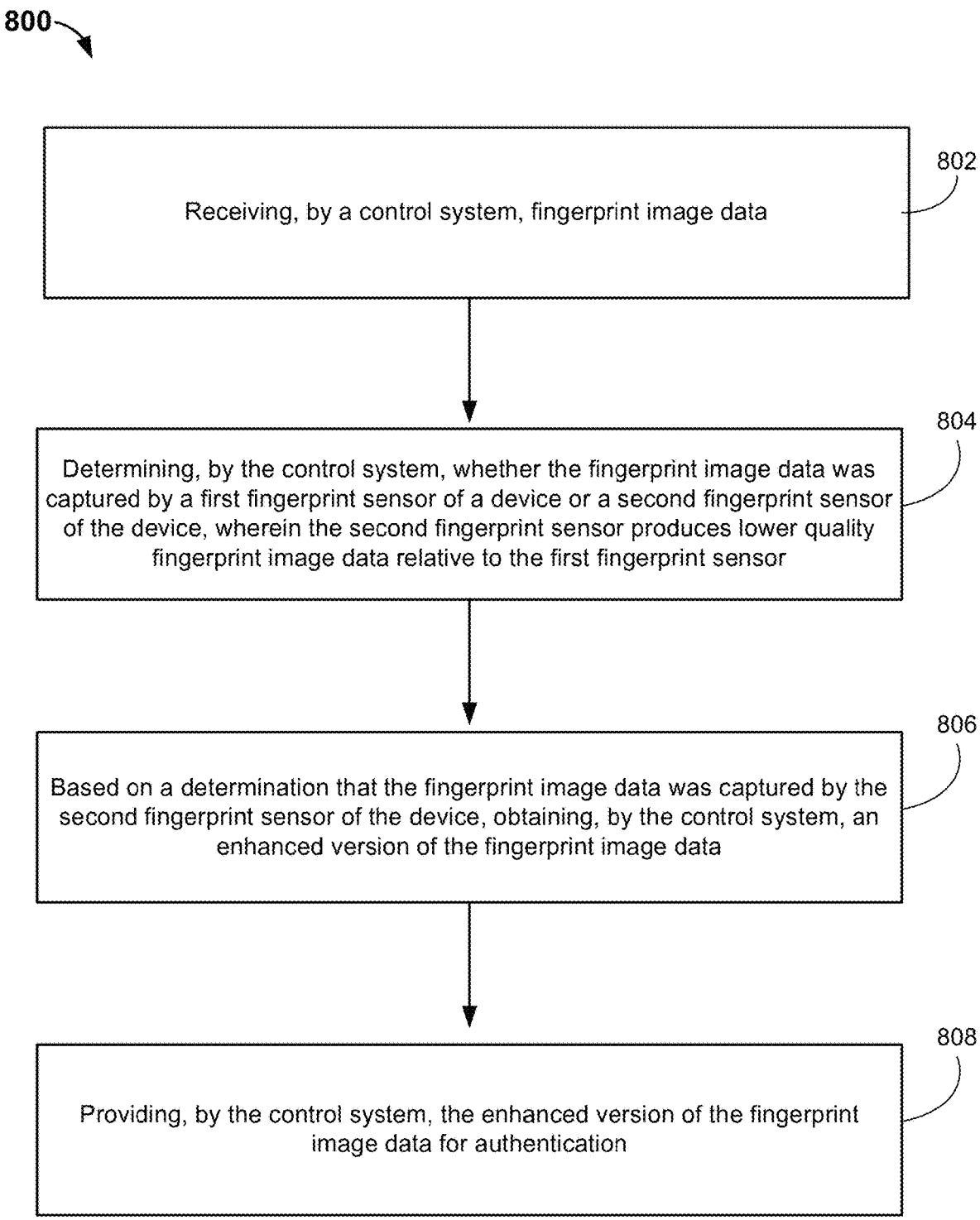
FIG. 8 is a flow diagram that provides example blocks of some methods disclosed herein.

FIG. 8 is a flow diagram that provides example blocks of some methods disclosed herein. The blocks of FIG. 8 may, for example, be performed by the apparatus 101, or by a similar apparatus. As with other methods disclosed herein, the method 800 outlined in FIG. 8 may include more or fewer blocks than indicated. Moreover, the blocks of methods disclosed herein are not necessarily performed in the order indicated. In some examples, some blocks of methods disclosed herein may be performed concurrently or substantially concurrently.

According to this example, the method 800 is a method of processing fingerprint image data. In this example, block 802 involves receiving, by a control system (such as the control system 106), fingerprint image data from a fingerprint sensor (such as the fingerprint sensor system 102 or the fingerprint sensor system 103).

In this example, block 804 involves determining, by the control system, whether the fingerprint image data was captured by a first fingerprint sensor of a device (such as the fingerprint sensor system 102) or a second fingerprint sensor of the device (such as the fingerprint sensor system 103). For example, the second fingerprint sensor may produce lower quality fingerprint image data relative to the first fingerprint sensor.

According to this example, block 806 involves, based on a determination that the fingerprint image data was captured by the second fingerprint sensor of the device, obtaining, by the control system, an enhanced version of the fingerprint image data. The enhanced version of the fingerprint image data may be generated by the image enhancement machine learning model, as described in reference to FIGS. 5A-5B and 6.

In this example, block 808 involves providing, by the control system, the enhanced version of the fingerprint image data for authentication.

According to some examples, the device may be a foldable display device having a sub panel comprising the first fingerprint sensor and a main panel comprising the second fingerprint sensor. In some examples, the method may involve matching fingerprint features extracted from the enhanced version of the fingerprint image data with fingerprint features extracted from an enhanced version of fingerprint image data obtained during a fingerprint enrollment process on the device. In some examples, the method may involve receiving, by the control system, new fingerprint image data; determining, by the control system, whether the new fingerprint image data was captured by the first fingerprint sensor of the device or the second fingerprint sensor of the device, wherein the first fingerprint sensor produces higher quality fingerprint image data relative to the second fingerprint sensor; and based on a determination that the new fingerprint image data was captured by the first fingerprint sensor of the device, providing, by the control system, the new fingerprint image data for authentication. In some examples, the method may involve matching fingerprint features extracted from the new fingerprint image data with fingerprint features extracted from fingerprint image data obtained during a fingerprint enrollment process on the device.

According to some examples, a user associated with the device is enrolled using the first fingerprint sensor and not the second fingerprint sensor. In some examples, once enrolled, the user may be authenticated by both the first fingerprint sensor and the second fingerprint sensor. In some examples, obtaining the enhanced version of the fingerprint image data involves providing the fingerprint image data as input to an image enhancement machine learning model that is trained to output the enhanced version of the fingerprint image data. In some examples, the image enhancement machine learning model is trained to transform the fingerprint image data from a first domain to a second domain, wherein the first domain corresponds to fingerprint image data captured by the second fingerprint sensor, and wherein the second domain corresponds to fingerprint image data associated with the first fingerprint sensor.

According to some examples, the image enhancement machine learning model includes at least one generator that transforms the fingerprint image data captured by the second fingerprint sensor to the enhanced version of the fingerprint image data; and at least one discriminator that is trained to predict a level of similarity between the enhanced version of the fingerprint image data outputted by the generator and fingerprint image data associated with the first fingerprint sensor. In some examples, prior to obtaining the enhanced version of the fingerprint image data, a determination is made that the fingerprint image data captured by the second fingerprint sensor fails to satisfy a quality threshold. In some examples, satisfaction of the quality threshold is determined based on whether the fingerprint image data captured by the second fingerprint sensor is authenticated by a matching process.

Implementation examples are described in the following numbered clauses:

1. A method of processing fingerprint image data, the method including: receiving, by a control system, fingerprint image data; determining, by the control system, whether the fingerprint image data was captured by a first fingerprint sensor of a device or a second fingerprint sensor of the device, wherein the second fingerprint sensor produces lower quality fingerprint image data relative to the first fingerprint sensor; based on a determination that the fingerprint image data was captured by the second fingerprint sensor of the device, obtaining, by the control system, an enhanced version of the fingerprint image data; and providing, by the control system, the enhanced version of the fingerprint image data for authentication.

2. The method of clause 1, where the device is a foldable display device having a sub panel comprising the first fingerprint sensor and a main panel comprising the second fingerprint sensor.

3. The method of clause 1 or clause 2, further including matching fingerprint features extracted from the enhanced version of the fingerprint image data with fingerprint features extracted from an enhanced version of fingerprint image data obtained during a fingerprint enrollment process on the device.

4. The method of any one of clauses 1-3, further including receiving, by the control system, new fingerprint image data; determining, by the control system, whether the new fingerprint image data was captured by the first fingerprint sensor of the device or the second fingerprint sensor of the device, wherein the first fingerprint sensor produces higher quality fingerprint image data relative to the second fingerprint sensor; and based on a determination that the new fingerprint image data was captured by the first fingerprint sensor of the device, providing, by the control system, the new fingerprint image data for authentication.

5. The method of any one of clause 4, further including matching fingerprint features extracted from the new fingerprint image data with fingerprint features extracted from fingerprint image data obtained during a fingerprint enrollment process on the device.

6. The method of any one of clauses 1-5, where a user associated with the device is enrolled using the first fingerprint sensor and not the second fingerprint sensor.

7. The method of any one of clauses 1-6, where, once enrolled, the user may be authenticated by both the first fingerprint sensor and the second fingerprint sensor.

8. The method of any one of clauses 1-7, where obtaining the enhanced version of the fingerprint image data involves providing the fingerprint image data as input to an image enhancement machine learning model that is trained to output the enhanced version of the fingerprint image data.

9. The method of clause 8, where the image enhancement machine learning model is trained to transform the fingerprint image data from a first domain to a second domain, wherein the first domain corresponds to fingerprint image data captured by the second fingerprint sensor, and wherein the second domain corresponds to fingerprint image data associated with the first fingerprint sensor.

10. The method of clauses 8 or clause 9, where the image enhancement machine learning model includes at least one generator that transforms the fingerprint image data captured by the second fingerprint sensor to the enhanced version of the fingerprint image data; and at least one discriminator that is trained to predict a level of similarity between the enhanced version of the fingerprint image data outputted by the generator and fingerprint image data associated with the first fingerprint sensor.

11. The method of any one of clauses 1-10, where prior to obtaining the enhanced version of the fingerprint image data, a determination is made that the fingerprint image data captured by the second fingerprint sensor fails to satisfy a quality threshold.

12. The method of any one of clauses 11, where satisfaction of the quality threshold is determined based on whether the fingerprint image data captured by the second fingerprint sensor is authenticated by a matching process.

13. An apparatus, including: a first fingerprint sensor; a second fingerprint sensor, and a control system configured to: receive fingerprint image data; determine whether the fingerprint image data was captured by the first fingerprint sensor or the second fingerprint sensor, wherein the second fingerprint sensor produces lower quality fingerprint image data relative to the first fingerprint sensor; based on a determination that the fingerprint image data was captured by the second fingerprint sensor, obtain an enhanced version of the fingerprint image data; and provide the enhanced version of the fingerprint image data for authentication.

14. The apparatus of clause 13, where the device is a foldable display device having a sub panel comprising the first fingerprint sensor and a main panel comprising the second fingerprint sensor.

15. The apparatus of clause 13 or clause 14, where prior to obtaining the enhanced version of the fingerprint image data, a determination is made that the fingerprint image data captured by the second fingerprint sensor fails to satisfy a quality threshold.

16. The apparatus of any one of clauses 13-15, where satisfaction of the quality threshold is determined based on whether the fingerprint image data captured by the second fingerprint sensor is authenticated by a matching process.

17. One or more non-transitory computer-readable media having instructions for performing a method stored thereon, the method including: receiving, by a control system, fingerprint image data; determining, by the control system, whether the fingerprint image data was captured by a first fingerprint sensor of a device or a second fingerprint sensor of the device, wherein the second fingerprint sensor produces lower quality fingerprint image data relative to the first fingerprint sensor; based on a determination that the fingerprint image data was captured by the second fingerprint sensor of the device, obtaining, by the control system, an enhanced version of the fingerprint image data; and providing, by the control system, the enhanced version of the fingerprint image data for authentication.

18. The one or more non-transitory computer-readable media of clause 17, where the device is a foldable display device having a sub panel comprising the first fingerprint sensor and a main panel comprising the second fingerprint sensor.

19. The one or more non-transitory computer-readable media of clause 17 or clause 18, where prior to obtaining the enhanced version of the fingerprint image data, a determination is made that the fingerprint image data captured by the second fingerprint sensor fails to satisfy a quality threshold.

20. The one or more non-transitory computer-readable media of clauses 17-19, where satisfaction of the quality threshold is determined based on whether the fingerprint image data captured by the second fingerprint sensor is authenticated by a matching process.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. A method of processing fingerprint image data, the method comprising:
    receiving, by a control system, fingerprint image data;
    determining, by the control system, whether the fingerprint image data was captured by a first fingerprint sensor of a device or a second fingerprint sensor of the device, wherein the second fingerprint sensor produces lower quality fingerprint image data relative to the first fingerprint sensor;
    based on a determination that the fingerprint image data was captured by the second fingerprint sensor of the device, obtaining, by the control system, an enhanced version of the fingerprint image data; and
    providing, by the control system, the enhanced version of the fingerprint image data for authentication.

2. The method of claim 1, wherein the device is a foldable display device having a sub panel comprising the first fingerprint sensor and a main panel comprising the second fingerprint sensor.

3. The method of claim 1, further comprising:
    matching fingerprint features extracted from the enhanced version of the fingerprint image data with fingerprint features extracted from an enhanced version of fingerprint image data obtained during a fingerprint enrollment process on the device.

4. The method of claim 1, further comprising:
    receiving, by the control system, new fingerprint image data;
    determining, by the control system, whether the new fingerprint image data was captured by the first fingerprint sensor of the device or the second fingerprint sensor of the device, wherein the first fingerprint sensor produces higher quality fingerprint image data relative to the second fingerprint sensor; and
    based on a determination that the new fingerprint image data was captured by the first fingerprint sensor of the device, providing, by the control system, the new fingerprint image data for authentication.

5. The method of claim 4, further comprising:
    matching fingerprint features extracted from the new fingerprint image data with fingerprint features extracted from fingerprint image data obtained during a fingerprint enrollment process on the device.

6. The method of claim 1, wherein a user associated with the device is enrolled using the first fingerprint sensor and not the second fingerprint sensor.

7. The method of claim 6, wherein, once enrolled, the user may be authenticated by both the first fingerprint sensor and the second fingerprint sensor.

8. The method of claim 1, wherein obtaining the enhanced version of the fingerprint image data involves providing the fingerprint image data as input to an image enhancement machine learning model that is trained to output the enhanced version of the fingerprint image data.

9. The method of claim 8, wherein the image enhancement machine learning model is trained to transform the fingerprint image data from a first domain to a second domain, wherein the first domain corresponds to fingerprint image data captured by the second fingerprint sensor, and wherein the second domain corresponds to fingerprint image data associated with the first fingerprint sensor.

10. The method of claim 8, wherein the image enhancement machine learning model comprises:

at least one generator that transforms the fingerprint image data captured by the second fingerprint sensor to the enhanced version of the fingerprint image data; and at least one discriminator that is trained to predict a level of similarity between the enhanced version of the fingerprint image data outputted by the generator and fingerprint image data associated with the first fingerprint sensor.

11. The method of claim 1, wherein, prior to obtaining the enhanced version of the fingerprint image data, a determination is made that the fingerprint image data captured by the second fingerprint sensor fails to satisfy a quality threshold.

12. The method of claim 11, wherein satisfaction of the quality threshold is determined based on whether the fingerprint image data captured by the second fingerprint sensor is authenticated by a matching process.

13. An apparatus, comprising:
a first fingerprint sensor;
a second fingerprint sensor; and
a control system configured to:
receive fingerprint image data;
determine whether the fingerprint image data was captured by the first fingerprint sensor or the second fingerprint sensor, wherein the second fingerprint sensor produces lower quality fingerprint image data relative to the first fingerprint sensor;
based on a determination that the fingerprint image data was captured by the second fingerprint sensor, obtain an enhanced version of the fingerprint image data; and
provide the enhanced version of the fingerprint image data for authentication.

14. The apparatus of claim 13, wherein the apparatus is a foldable display device having a sub panel comprising the first fingerprint sensor and a main panel comprising the second fingerprint sensor.

15. The apparatus of claim 13, wherein, prior to obtaining the enhanced version of the fingerprint image data, a determination is made that the fingerprint image data captured by the second fingerprint sensor fails to satisfy a quality threshold.

16. The apparatus of claim 15, wherein satisfaction of the quality threshold is determined based on whether the fingerprint image data captured by the second fingerprint sensor is authenticated by a matching process.

17. One or more non-transitory computer-readable media having instructions for performing a method stored thereon, the method comprising:
receiving, by a control system, fingerprint image data;
determining, by the control system, whether the fingerprint image data was captured by a first fingerprint sensor of a device or a second fingerprint sensor of the device, wherein the second fingerprint sensor produces lower quality fingerprint image data relative to the first fingerprint sensor;
based on a determination that the fingerprint image data was captured by the second fingerprint sensor of the device, obtaining, by the control system, an enhanced version of the fingerprint image data; and
providing, by the control system, the enhanced version of the fingerprint image data for authentication.

18. The one or more non-transitory computer-readable media of claim 17, wherein the device is a foldable display device having a sub panel comprising the first fingerprint sensor and a main panel comprising the second fingerprint sensor.

19. The one or more non-transitory computer-readable media of claim 17, wherein, prior to obtaining the enhanced version of the fingerprint image data, a determination is made that the fingerprint image data captured by the second fingerprint sensor fails to satisfy a quality threshold.

20. The one or more non-transitory computer-readable media of claim 19, wherein satisfaction of the quality threshold is determined based on whether the fingerprint image data captured by the second fingerprint sensor is authenticated by a matching process.

* * * * *